(12) United States Patent
Väänänen

(10) Patent No.: US 7,203,230 B2
(45) Date of Patent: Apr. 10, 2007

(54) METHOD AND SYSTEM FOR TRAINING ADAPTIVE CHANNEL EQUALIZATION

(75) Inventor: Janne Väänänen, Espoo (FI)

(73) Assignee: Tellabs Oy, Espoo (FI)

( * ) Notice: Subject to any disclaimer, the term of this patent is extended or adjusted under 35 U.S.C. 154(b) by 855 days.

(21) Appl. No.: 10/204,249

(22) PCT Filed: Feb. 19, 2001

(86) PCT No.: PCT/FI01/00160

§ 371 (c)(1),
(2), (4) Date: Oct. 21, 2002

(87) PCT Pub. No.: WO01/63868

PCT Pub. Date: Aug. 30, 2001

(65) Prior Publication Data

US 2003/0091111 A1  May 15, 2003

(30) Foreign Application Priority Data

Feb. 21, 2000  (FI) .................................. 20000398

(51) Int. Cl.
*H03H 7/30* (2006.01)
(52) U.S. Cl. .................................................. 375/229
(58) Field of Classification Search ................ 375/235, 375/233, 232, 231, 230, 229, 295, 316, 377, 375/261, 260, 259; 379/398; 708/323, 322, 708/300, 200, 100; 370/207, 206, 203
See application file for complete search history.

(56) References Cited

U.S. PATENT DOCUMENTS 4,227,152 A * 10/1980 Godard et al. .............. 375/231
6,360,369 B1 * 3/2002 Mahoney .................... 725/111
6,493,381 B1 * 12/2002 Werner et al. .............. 375/232
6,842,495 B1 * 1/2005 Jaffe et al. .................. 375/326

FOREIGN PATENT DOCUMENTS

EP    1 014 635 A2   6/2000

OTHER PUBLICATIONS

Garth et al., IEEE Transactions on Communications, vol. 49, No. 3, pp. 455-466 (2001).
Yang et al., 13th International Conference on Digital Signal Processing Proceedings, vol. 1, DSP 97, pp. 127-130 (1997).

* cited by examiner

Primary Examiner—Pankaj Kumar
(74) Attorney, Agent, or Firm—Birch, Stewart, Kolasch & Birch, LLP

(57) ABSTRACT

The invention relates to implementing a training phase of adaptive channel equalization on a digital communications path using QAM- or CAP-modulation method and comprising at least one band-stop filter that forms a stop band on a the signal spectrum. Training of adaptive equalizers is performed utilizing a sparse symbol constellation, wherein a number of symbol states (S) is smaller than that of a symbol constellation used in a normal data transmission state. The benefit of the sparse symbol constellation is that a strong intersymbol interference caused by the stop band can thus be reduced to such a low level in regard to a signal power that a linear equalizer may be used to reach a situation, wherein a proportion of correct symbol decisions becomes sufficiently high for training of a decision-feedback equalizer.

16 Claims, 8 Drawing Sheets

Symbol constellation A,
used during data transmission state
(drawn in an arbitrary scale)

Sparse symbol constellation B,
used during training period of
adaptive equalizers

METHOD AND SYSTEM FOR TRAINING ADAPTIVE CHANNEL EQUALIZATION

This application is the national phase under 35 U.S.C. § 371 of PCT International Application No. PCT/FI01/00160 which has an International filing date of Feb. 19, 2001, which designated the United States of America.

1. FIELD OF THE INVENTION

The invention relates to a method for implementing a training phase of adaptive channel equalization on a digital communications path, wherein the data transfer channel has a stop band (or stop bands) on the signal spectrum.

The invention also relates to a system for performing a training phase of adaptive channel equalization on a digital communications path, whose data transfer channel has a stop band (or stop bands) on the signal spectrum, and further to a transmitter suited for participating a training phase of adaptive channel equalization on a digital communications path, whose data transfer channel has a stop band (or stop bands) on the signal spectrum.

2. BACKGROUND ART

In the text describing the prior art and the features of the present invention, the following abbreviations are used:
CAP Carrierless amplitude and phase modulation
DFE Decision-feedback equalizer
FFE Feedforward equalizer
LMS Least-mean-square
PAM Pulse amplitude modulation
QAM Quadrature amplitude modulation
RX Receiver
TX Transmitter
TML Tomlinson-Harashima precoder Copper wirelines serving subscriber connections will be used for data transmission at increasingly higher speeds. Plausibly the transmission speeds will be extended to tens of megabits per second and higher. Herein, the bandwidth of the modulated signal will be in the order of 10 MHz.

When the modulation bandwidth reaches the megahertz range, different kinds of radio-frequency interference appear problematic particularly when overhead cables are used for subscriber connections. The modem receiver (RX) may also be subject to interference from radio stations emitting broadcast signals and radio-amateur stations, whose radio-frequency transmissions may be captured by the overhead cable so as to cause a so-called transverse interference signal component in the twisted pair cable and thus reach the receiver of the modem connection in an interference-causing manner. In a converse manner, the modem connection may disturb radio station listeners or reception at a radio-amateur station, because the power spectrum of the modulated signal traveling along the pair cable contains energy at the radio-frequency bands mentioned above and a portion of this energy is radiated to the environment.

The radio-frequency interference caused by the transmitter (TX) of the modem connection can be eliminated by way of filtering the power spectrum of the modem output signal free from emissions at the frequency bands coinciding with those subject to interference. The bandstop filters required herein may be implemented using analog, digital or both of these techniques. The radio-frequency interference coupled over the cable to the modem receive circuit may be filtered away by providing the receiver (RX) with suitable bandstop filters that may be implemented using analog, digital or both of these techniques, respectively.

In fast modems, signal processing generally is accomplished digitally, whereby the receive signal is first converted into digital format by an analog-to-digital converter (AD converter). Inasmuch the level of the radio-frequency interference emission may be high as compared with the received data signal, it is advantageous to in the optimum utilization of the dynamic range of the AD converter to perform the elimination of the radio-frequency interference at least up to a certain degree by means of bandstop filters that are realized with the help of the analog techniques and placed preceding the AD conversion.

On a modem connection, the signal transmission path (cable, line transformers, filters, etc.) cause amplitude and phase distortion on the signal that is generally compensated for by means of equalizers that are located in the receiver, the transmitter or partially in both. Bandstop filters used in the receiver, the transmitter or in both of these communicating units are particularly problematic as to the signal distortion, because the filters form a signal-eliminating stop band (or stop bands) on the signal spectrum, thus blocking or essentially weakening the transmission of certain frequency components of the data signal, too. In the discussion to follow, the bandstop filters located in the receiver, the transmitter or partially in both are considered to form a portion of the transmission channel.

An equalization technique of channel distortion commonly used in modems based on a linear modulation system (PAM, QAM, CAP) is to employ an adaptive linear equalizer (FFE) and an adaptive feedback equalizer. If the feedback equalizer is located in the receiver, it is called a decision-feedback equalizer (DFE) and, respectively, if located in the transmitter, it is known as a Tomlinson-Harashima precoder (TML). The system may also be provided with both the DFE and the TML. Furthermore, the linear equalizer may be located in the receiver, the transmitter or a part thereof in the transmitter and another part in the receiver.

In the following, a digital communications channel is examined in terms of the training phase of its adaptive equalizers. The line code used on the channel may be either a quadrature-amplitude modulation (QAM) or a carrierless amplitude and phase modulation (CAP). In FIG. 1 is shown a model for a system implemented using conventional techniques, wherein the receiver is provided with an adaptive linear equalizer (FFE) and an adaptive decision-feedback equalizer (DFE) (cf. Lee & Messerschmitt). The fixed filters and modulation schemes are included in the channel noise model (CHN). The outgoing bit stream is coded into symbols (S) that are sent through the channel 2. In the receiver, the output signal of the channel 2 is processed by equalizers (FFE and DFE), and the decisions on symbols (S') are made from the equalized signal. The decision resulting in the resolved symbol (S') is also called the estimated received symbol. The transmitted bit stream is recovered on the basis of the estimated received symbols (S') resolved by the receiver (RX). Both adaptive equalizers are adapted to the characteristics of the channel 2 during the training period carried out when a connection is being established. The equalizers are also continually adjusted during the period of data transmission in order to compensate for possible changes in the channel 2. The equalizers are adapted and controlled on the basis of the detection error (e) of the receive signal with the help of a least-mean-squares (LMS) algorithm.

In FIG. 2 is shown another system according to the prior art (cf. Lee & Messerschmitt). The receiver has an adaptive linear equalizer (FFE), while the transmitter has a feedback equalizer (of the TML type). During the training period, also this system operates in the same fashion as that illustrated in FIG. 1 using a linear equalizer (FFE) and a decision-feedback equalizer (DFE). At the end of the training period, the tap-weight values of the decision-feedback equalizer (DFE) are transmitted over an upstream auxiliary channel to the transmitter, wherein they are utilized in the configuration of a Tomlinson-Harashima precoder (TML).

The methods generally used for training an adaptive channel equalizer to the characteristics of a transmission channel are blind training, which takes place from data, and forced training. In blind training, the transmitter (TX) sends during the training period a similar signal as that of a normal data transmission state and the receiver (RX) has no a priori information on the sent symbols. Hence, blind training is based on the statistical properties of the receive signal, wherefrom the receiver can adjust the equalizers into a correct state (e.g., assuming that each symbol of the symbol constellation occurs at an equal statistical probability). Generally, it is necessary to use a dedicated training detector during the training period in the same fashion as a circle detector is used in certain types of voice-frequency modems, for instance. FIG. 3 shows the timing diagram of the functional steps of the timing diagram of blind training. In forced training, the receiver (RX) has a priori information on the data (i.e., the training sequence) being sent by the transmitter (TX) during the training period. The equalizer adjustment is based on the difference values between the a priori known training sequence and the received signal. A problem hampering forced training is that the transmitter (TX) must submit the receiver (RX) signaling information on the start instant of the training sequence. Under the circumstances of practical channels, the transmission of such a start signal with a sufficiently high timing accuracy is often difficult. FIG. 4 shows a timing diagram of the functional steps of forced training.

In blind training the stop bands placed on the signal spectrum cause problems. To generate such stop bands, the transfer function of the communications channel must have one or more nulls that fall within the frequency spectrum of the data signal. These spectral nulls deteriorate the transmission of certain frequency components of the data signal so much that in terms of channel equalization, it is more correct to discuss the nulls of the transmission channel frequency spectrum that entirely prevent the transmission of the data signal at its frequency components falling on the spectral nulls of the channel. A linear equalizer (FFE) is incapable of fully compensating for the distortion caused by the spectral nulls of the channel, because a complete compensation of a spectral null in the channel transfer function would require infinite gain in the transfer function of the linear equalizer (FFE) at the frequency of each spectral null of the transmission channel. In other words, when there are spectral nulls in the transfer function of the channel and only a linear equalizer (FFE) is available, the equalizer output will inevitably bear some degree of intersymbol interference (ISI). The degree of intersymbol interference in proportion to the signal energy at the output of the linear equalizer (FFE) is dependent on such factors as the number, frequencies and Q-factors of the spectral nulls. Intersymbol interference complicates correct decision-making on received symbols in the same manner as noise. On the other hand, a sufficiently high proportion of the symbol decisions should be correct in order to permit the decision-feedback equalizer (DFE) to adapt so as to perform the compensation of channel distortion. Hence, blind training fails if the channel transfer function has such spectral nulls that a linear equalizer (FFE) alone is incapable of giving a sufficiently good symbol error rate for the adaptation of the decision-feedback equalizer (DFE).

3. BRIEF SUMMARY OF THE INVENTION

It is an object of the present invention to overcome the drawbacks of the above-described techniques and to provide entirely novel types of method, system, and transmitter for use on a digital communications channel.

The goal of the invention is achieved by way of performing the training of adaptive equalizers on a channel having stop bands different from zero frequency on the frequency band of the data signal using a method which is otherwise similar to blind training but uses during the training period such a symbol constellation that a linear equalizer (FFE) alone gives a situation, wherein a sufficiently high proportion of the symbol decisions are correct for the purpose of adapting the decision-feedback equalizer (DFE) to the channel distortion. Then, the transmitter (TX) need not send the exact start instant of the training sequence to the receiver (RX).

A method according to the invention for implementing a training phase of adaptive channel equalization in a digital communication arrangement comprising a transmitter, a receiver, and a channel, the method comprising:

- in the transmitter, coding a bit stream into symbols,
- in the transmitter, forming a transmission signal containing information of the symbols by using one of a QAM-modulation method and a CAP-modulation method,
- in the transmitter, sending the transmission signal to the channel,
- in the receiver, receiving the transmission signal from the channel,
- in the receiver, processing the received transmission signal with a linear equalizer and with an adaptive decision feedback equalizer, and
- forming at least one stop band on a spectrum of the transmission signal by using at least one band-stop filter, each band-stop filter being located in one of the transmitter and the receiver, the method further comprising:

- in the transmitter, using a sparse symbol constellation during at least a part of a training period of the adaptive decision feedback equalizer, the number of symbol states of the sparse symbol constellation being smaller than that of a basic symbol constellation used in a normal data transmission state,
- in the receiver, performing training of the adaptive decision feedback equalizer at least partially using symbol decisions made with a detector of the sparse symbol constellation, and
- moving the digital communication arrangement from the training phase to the normal data transmission state by replacing in the transmitter the sparse symbol constellation with the basic symbol constellation used in a normal data transmission state and by replacing in the receiver the detector of the sparse symbol constellation with a detector of the basic symbol constellation.

A system according to the invention for implementing a training phase of adaptive channel equalization in a digital communication arrangement comprising a transmitter, a receiver, and a channel, the system comprising:

in the transmitter, coding means for coding a bit stream into symbols, in the transmitter, modulation means for forming a transmission signal containing information of the symbols by using one of a QAM-modulation method and a CAP-modulation method, in the transmitter, sending means for sending the transmission signal to the channel, in the receiver, receiving means for receiving the transmission signal from the channel, in the receiver, a linear equalizer and an adaptive decision feedback equalizer configured to process the received transmission signal, in the receiver, a detector configured to make symbol decisions from the received transmission signal processed by the linear equalizer and the adaptive decision feedback equalizer, in the receiver, decoding means for recovering the bit stream from the symbol decisions, and at least one band-stop filter forming at least one stop band on a spectrum of the transmission signal, each band-stop filter being located in one of the following:

the transmitter and the receiver, the system further comprising:

in the transmitter, means for generating symbols representing a sparse symbol constellation during at least a part of a training period of the adaptive decision feedback equalizer, the number of symbol states of the sparse symbol constellation being smaller than that of a basic symbol constellation that is used in a normal data transmission state, in the transmitter, means for replacing the sparse symbol constellation with the basic symbol constellation used in the normal data transmission state as a response to a situation in which the communication arrangement moves from the training phase to the normal data transmission state, in the receiver, means for performing training of the adaptive decision feedback equalizer at least partially using symbol decisions made with a detector of the sparse symbol constellation, and in the receiver, means for replacing the detector of the sparse symbol constellation with a detector of the basic symbol constellation used in the normal data transmission state as a response to a situation in which the digital communication arrangement moves from the training phase to the normal data transmission state.

A transmitter according to the invention for implementing a training phase of adaptive channel equalization in a digital communication arrangement comprising the transmitter, a receiver, and a channel, the transmitter comprising:

coding means for encoding a bit stream into symbols, modulation means for forming a transmission signal containing information of the symbols by using one of a QAM-modulation method and a CAP-modulation method, sending means for sending the transmission signal to the channel, and at least one band-stop filter forming at least one stop band on a spectrum of the transmission signal, the transmitter further comprising:

means for generating generate symbols representing a sparse symbol constellation during at least a part of a training period of an adaptive decision feedback equalizer of the receiver, the number of symbol states of the sparse symbol constellation being smaller than that of a basic symbol constellation used in a normal data transmission state, and means for replacing the sparse symbol constellation with the basic symbol constellation used in the normal data transmission state as a response to a situation in which the communication arrangement moves from the training phase to the normal data transmission state.

A receiver for implementing a training phase of adaptive channel equalization in a digital communication arrangement including a transmitter, the receiver, and a channel, the transmitter comprising:

receiving means for receiving a transmission signal of the transmitter from the channel;

a linear equalizer and an adaptive decision feedback equalizer configured to process the received transmission signal, the received transmission signal including symbols representing a sparse symbol constellation during at least a part of a training period of the adaptive decision feedback equalizer, the number of symbol states of the sparse symbol constellation being smaller than that of a basic symbol constellation that is used in a normal data transmission state;

a detector configured to make symbol decisions from the received transmission signal processed by the linear equalizer and the adaptive decision feedback equalizer;

decoding means for recovering the bit stream from the symbol decisions;

at least one band-stop filter forming at least one stop band on a spectrum of the transmission signal;

means for performing training of the adaptive decision feedback equalizer at least partially using symbol decisions made with detection of the sparse symbol constellation; and means for replacing the detector of the sparse symbol constellation with a detector of the basic symbol constellation used in the normal data transmission state as a response to a situation in which the digital communication arrangement moves from the training phase to the normal data transmission state.

The invention offers significant benefits.

The invention makes it possible that even under a situation where the channel has stop bands on the frequency spectrum of the data signal, the training of adaptive filters to the channel distortion does not need the transmission of the exact start instant of the training sequence from the transmitter (TX) to the receiver (RX).

4. BRIEF DESCRIPTION OF THE FIGURES

In the following, the invention is described in more detail with reference to exemplifying embodiments elucidated in the appended drawings in which FIG. 1 shows a block diagram of a system of the prior art for implementing channel equalization;

5. DETAILED DESCRIPTION OF THE PREFERRED EMBODIMENTS OF THE INVENTION

Accordingly, the invention concerns a method and apparatus suitable for implementing the training of adaptive equalizers to channel distortion in a situation, wherein the channel includes bandstop filters that cause one or a greater number of stop bands on the transmission spectrum of a data signal. The theoretical basis of the method will be evident to the reader from the discussion given below.

Figure 1:
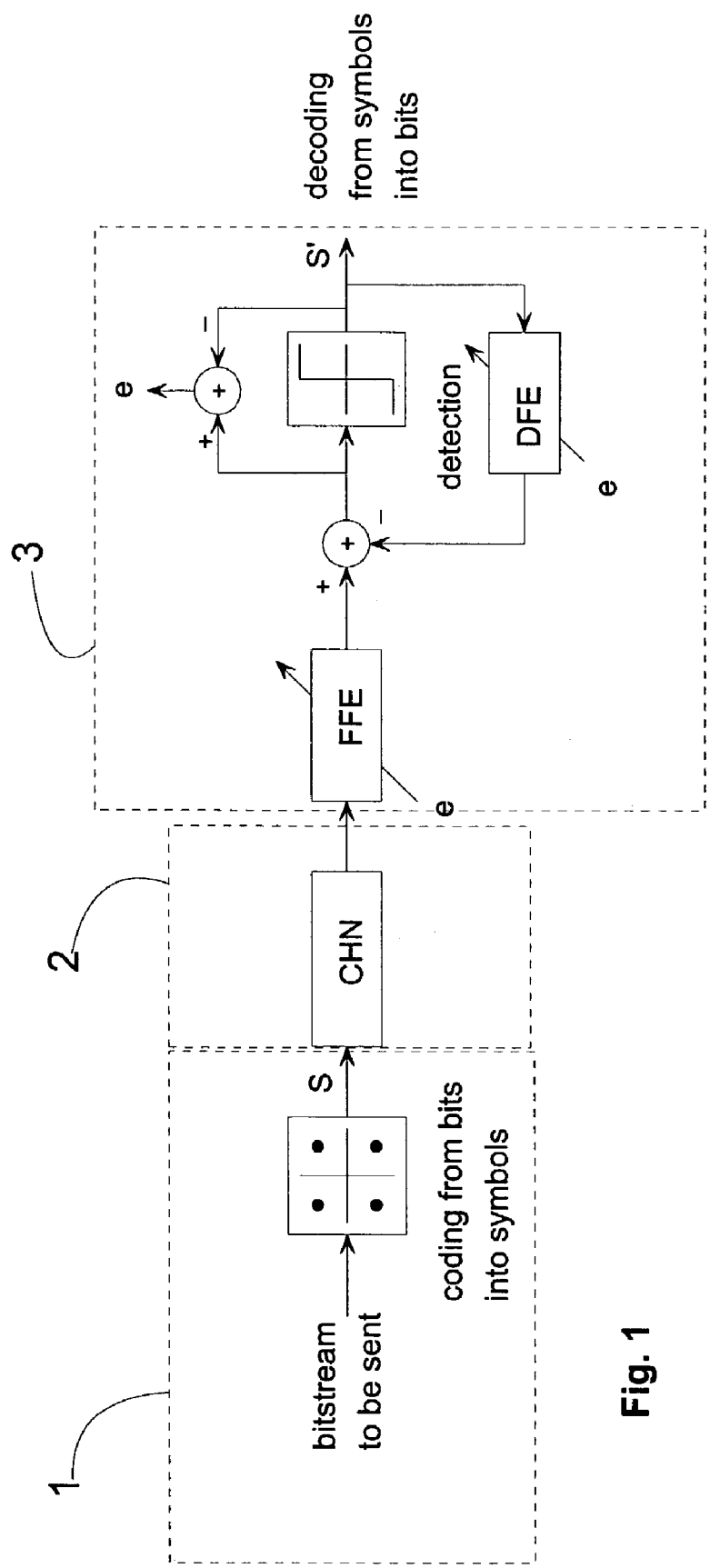
Figure 2:
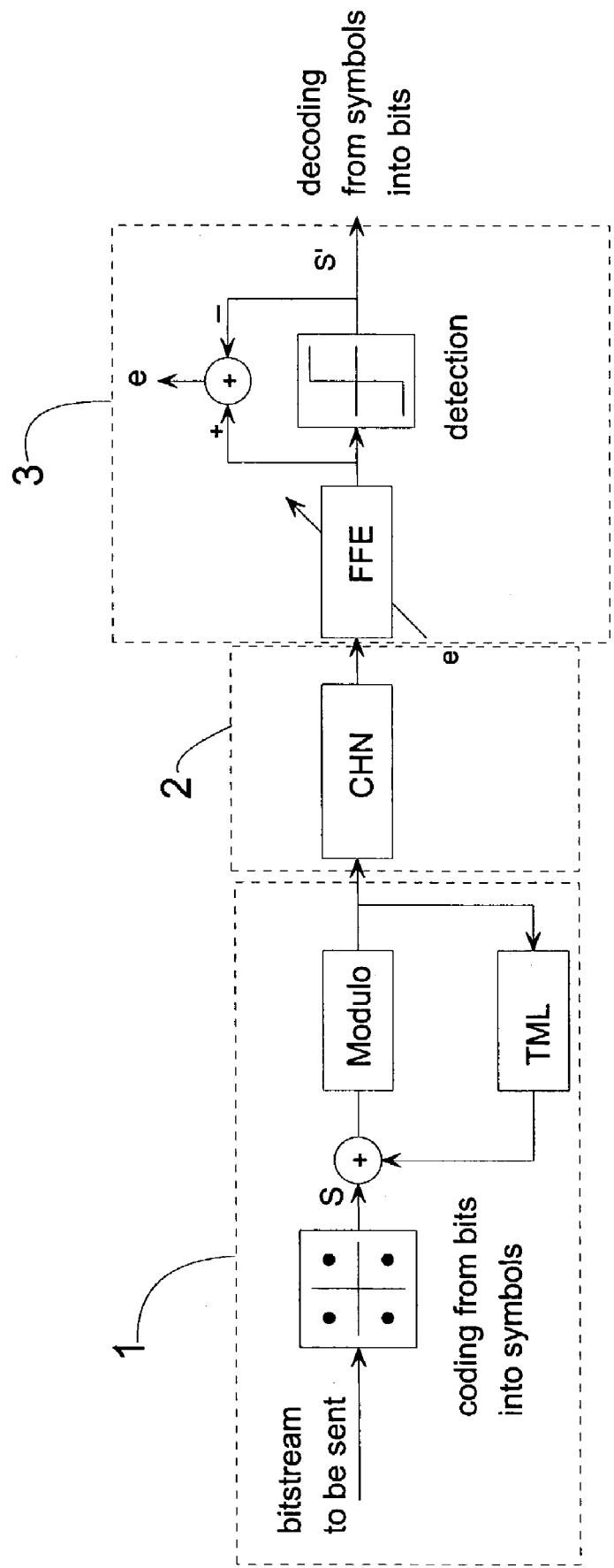
FIG. 2 shows a block diagram of another system of the prior art for implementing channel equalization.
Figure 3:
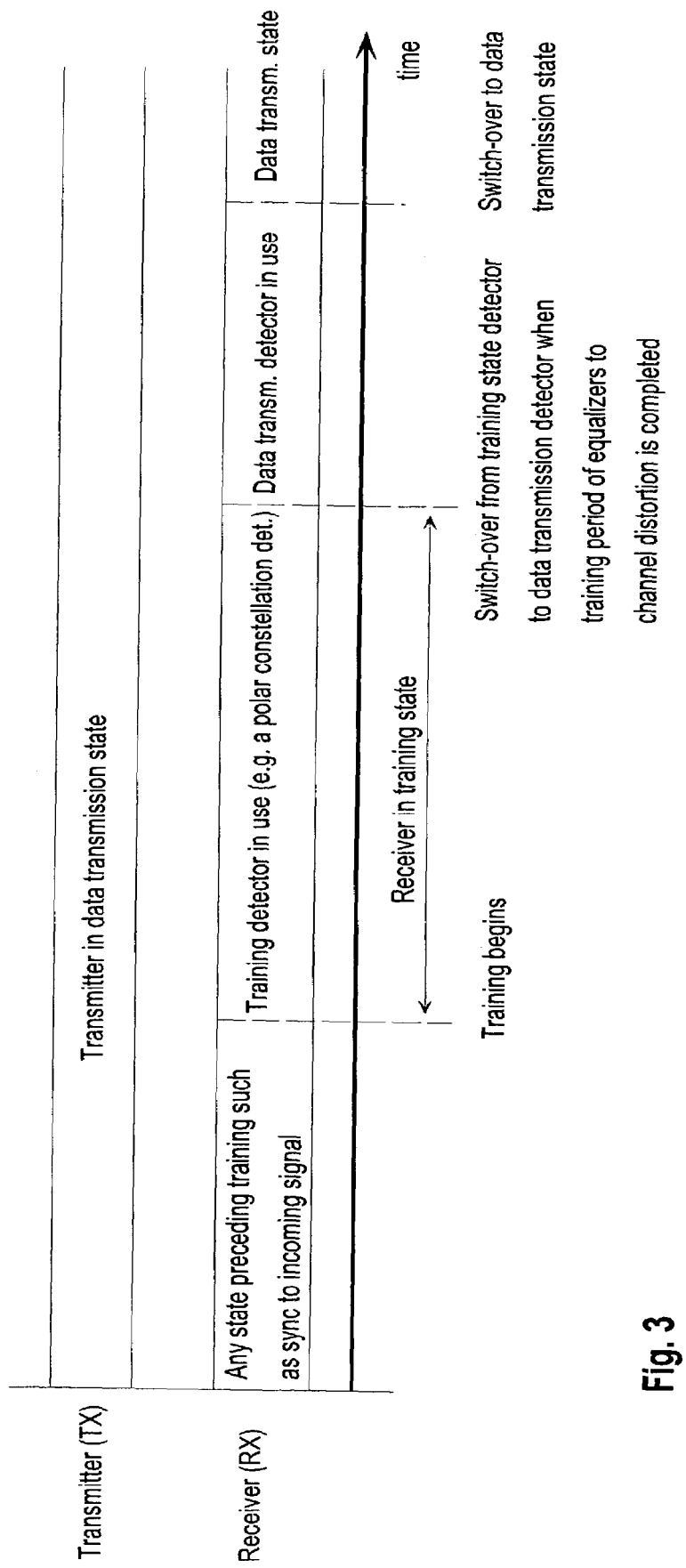
FIG. 3 shows a timing diagram of a conventional training process of adaptive equalizers to channel distortion.
Figure 4:
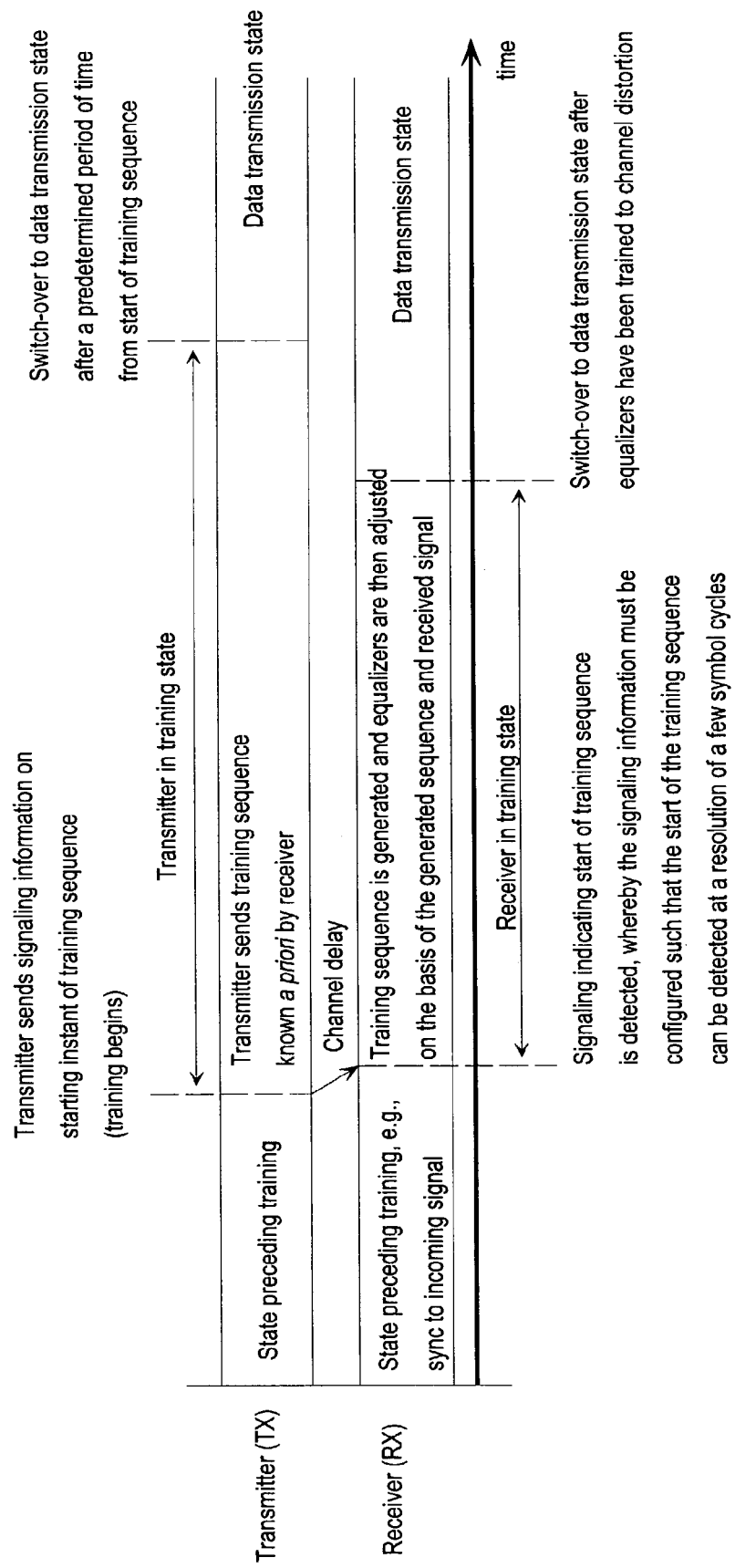
FIG. 4 shows a timing diagram of another conventional training process of adaptive equalizers to channel distortion.
Figure 5:
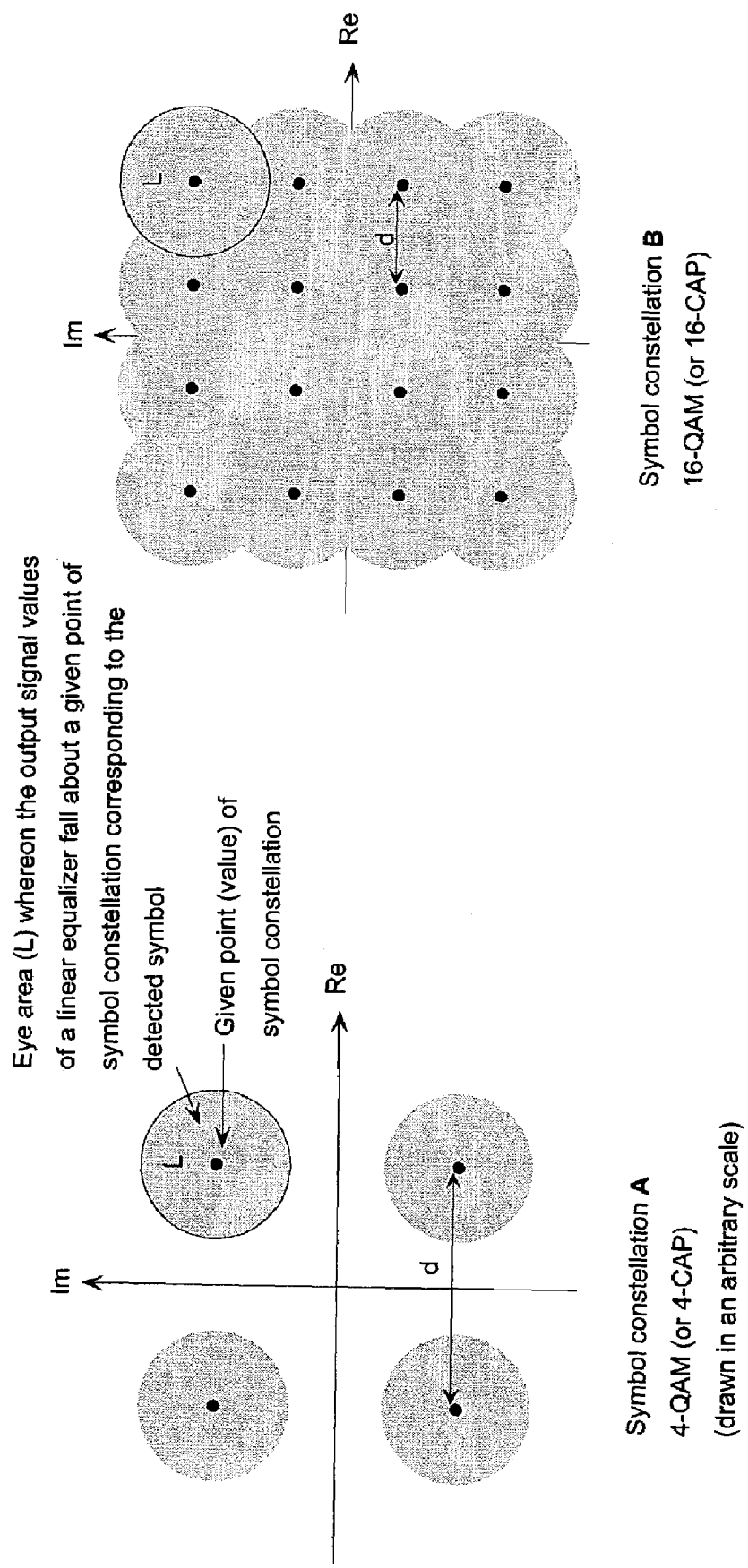
FIG. 5 shows two possible symbol constellations usable in QAM or CAP modulation schemes and also diagrammatically the eyes within which the output states of a linear equalizer fall due to intersymbol interference caused by stop bands located on the signal spectrum of the transmission channel.

Referring to FIG. 5, therein is shown in the complex plane two possible symbol constellations (A and B) that are suited for use in a QAM or CAP modulation scheme, as well as diagrammatically outlined eyes (L) within which the output states of a linear equalizer fall due to intersymbol interference caused by stop bands located on the signal spectrum of the transmission channel. Symbol constellation A represents a 4-QAM scheme (or, alternatively, a 4-CAP scheme), while symbol constellation B represents a 16-QAM scheme (or, alternatively, a 16-CAP scheme). The intersymbol distance between neighboring points of the symbol constellation is denoted by letter d.

Even if the channel happens to be entirely noise-free, the output states of a linear equalizer (FFE) would not map exactly on the points of the symbol constellation, but rather, the intersymbol interference caused by the stop bands would make the symbol states to scatter over the eyes (L) surrounding the ideal points of the symbol constellation. From FIG. 5 it is easy to see that the risk of incorrect symbol recovery decisions is essentially higher in symbol constellation B than in constellation A, since in constellation B the eyes (L) corresponding to the different symbol points overlap with each other.

The area of the eye (L) surrounding a symbol mapping point is proportional to the strength of the intersymbol interference. With the help of conventional signal analysis, it can be shown that the strength of the intersymbol interference in turn is proportional to the signal power.

The invention is based on the following concept:

1) The strength of the intersymbol interference due to channel stop bands at the output of the linear equalizer (FFE), indicated as the area of the eye (L) per symbol, is proportional to the signal power.
2) The ratio of the intersymbol distance (d) between neighboring points of the symbol constellation to the signal power and, hence, to the area of the eye (L) can be increased by way of making the symbol constellation sparser.

A corollary of the above reasoning is that the proportion of incorrect symbol recovery decisions becomes smaller when the symbol constellation is made sparser.

The method according to the invention for training adaptive equalizers for the compensation of channel distortion is otherwise similar to conventional blind training with the exception that during the training period, there is used a sparser symbol constellation, whereby it is possible to reach even with a linear equalizer (FFE) alone a situation, wherein a sufficiently high proportion of the symbol decisions are correct, thus allowing the decision-feedback equalizer (DFE) to be trained for the compensation of channel distortion.

Figure 6:
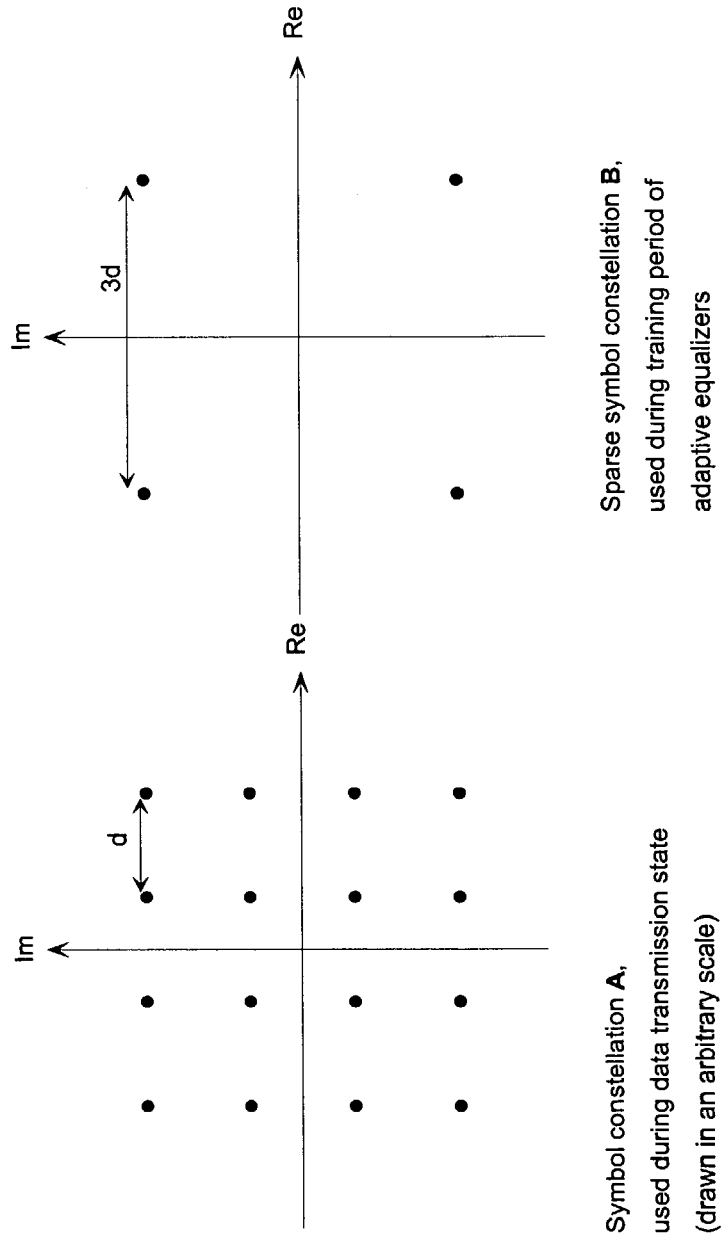
FIG. 6 shows a possible symbol constellations usable in QAM or CAP modulation schemes and, respectively, a sparsely mapped symbol constellation suitable for use in the method according to the invention.

Referring to FIG. 6, therein is shown a possible symbol constellations A usable in QAM or CAP modulation schemes and, respectively, a sparsely mapped symbol constellation B suitable for use in the method according to the invention. The sparse constellation (B) is formed from the original symbol constellation (A) of the data signal states by selecting only the extreme corner points for use. It must be noted herein that generally the number of different symbol states (S) in a symbol constellation used during the training period is smaller that the number of symbol states in the constellation used during the actual data transmission. Advantageously in the spirit of the method according to the invention, the symbol points of the sparse symbol constellation used during the training period coincide with the corresponding points of the original symbol constellation as shown in FIG. 6. While this feature is not necessary under all circumstances, it generally makes it easier to the switch from the training phase to the data transmission state.

Obviously, the sparse symbol constellation may also be used for signaling between the transmitter (TX) and the receiver (RX).

Figure 7:
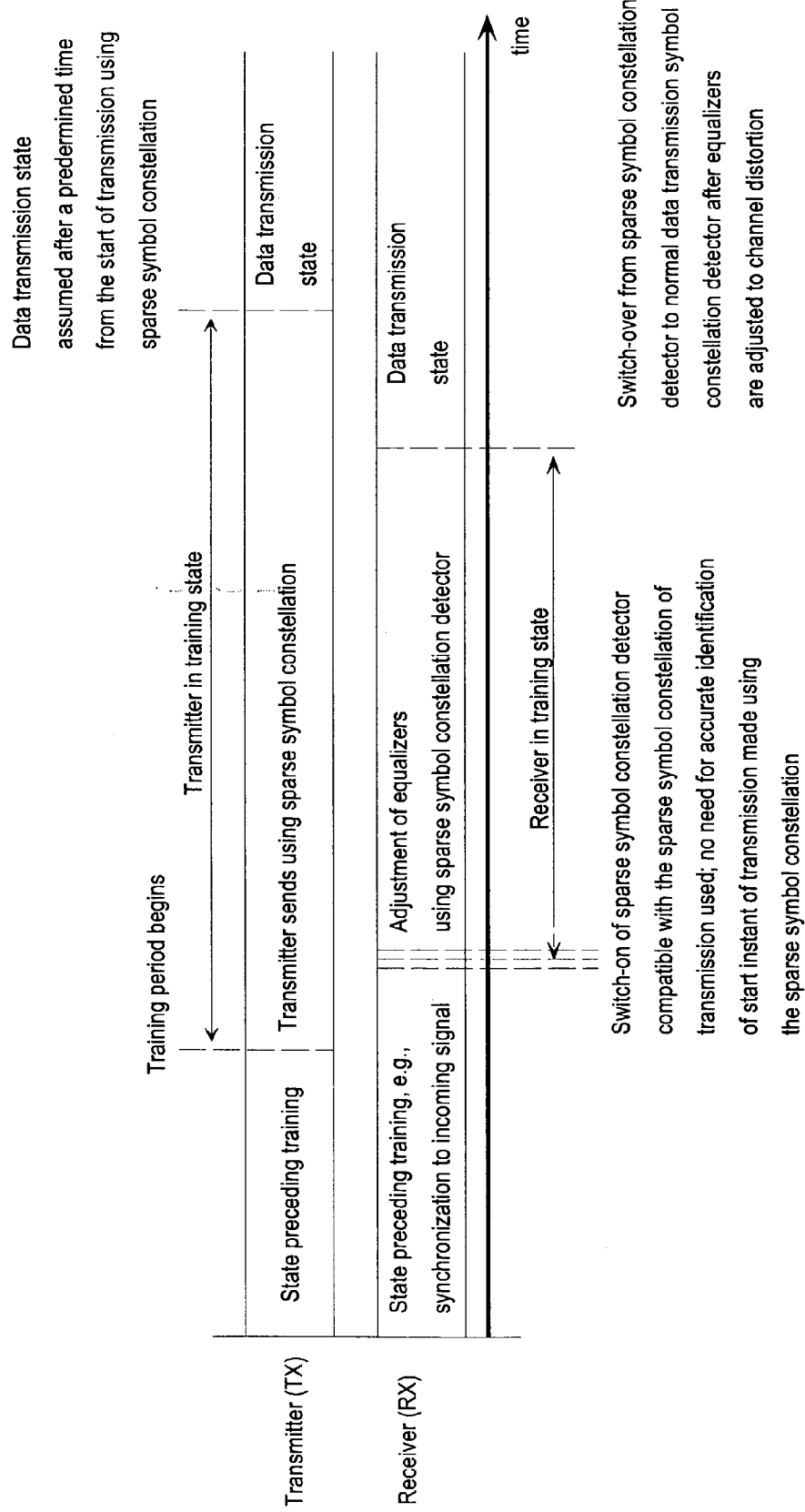
FIG. 7 shows a timing diagram of a training process according to the invention of adaptive equalizers to channel distortion.

The functional steps of the method according to the invention are elucidated in the timing diagram shown in FIG. 7. Herein, transmitter (TX) sends data during the training period using the sparse symbol constellation. Receiver (RX) adjusts the equalizers using a similar (sparse) detector corresponding to the sparse symbol constellation. After the equalizers have been trained for a given time or a stable state has been reached, the system can be switched to data transmission with the provision that the error measurable at the detector input is sufficiently low. At the transmitter (TX), switching to the data transmission state also means adoption of the symbol constellation of the data transmission state, while the receiver (RX) in a respective manner switches from the sparse symbol constellation to a detector corresponding the symbol constellation of the data transmission state. In terms of the mutual timing between the transmitter (TX) and the receiver (RX), it is sufficient that the transmitter (TX) sends data using the sparse constellation for such a time that receiver (RX) can finish the training of its equalizers before the transmitter (TX) switches over to the data transmission state. In practice, this can be accomplished using predetermined state intervals.

Figure 8:
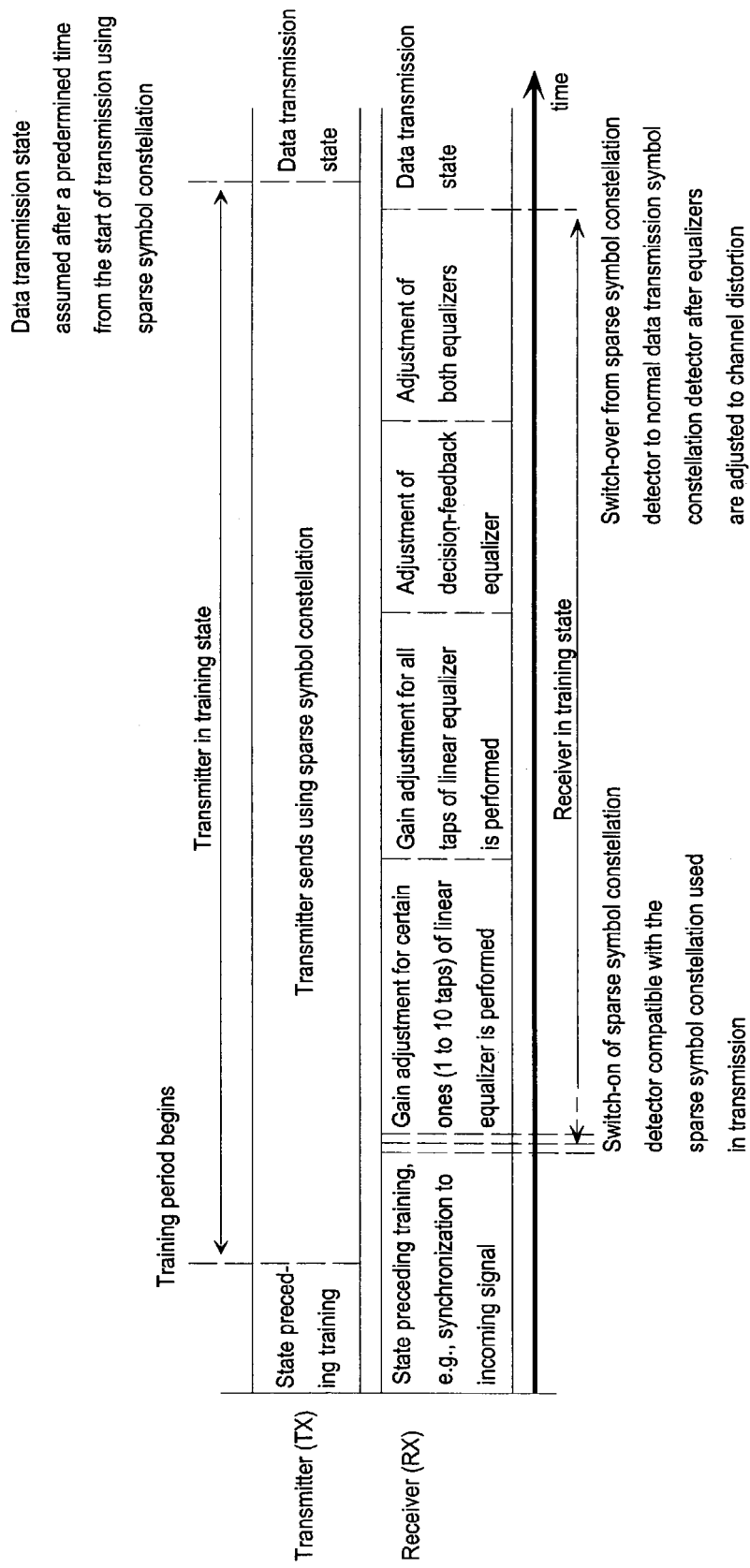
FIG. 8 shows in greater detail a timing diagram of a training process according to the invention for adaptive equalizers to channel distortion.

A more detailed timing diagram of a possible training phase sequence accomplished using the method according to the invention is shown in FIG. 8. During the training period, transmitter (TX) sends data using the sparse symbol constellation whose points coincide with the respective points of the symbol constellation used in the data transmission state. In the beginning of training, receiver (RX) initializes the tap gains of the linear equalizer (FFE) and the decision-feedback equalizer (DFE) to zero. Subsequently, the gains of certain taps (1 to 10) in the linear equalizer (FFE) are adjusted with the help of an LMS algorithm using the sparse constellation. The taps being adjusted are selected from the group of taps where the main tap gain is desired to become largest. Next, all the tap gains of the linear equalizer (FFE) are adjusted using the sparse constellation. After the linear equalizer (FFE) has reached a stable state or has been adjusted for a predetermined period of time, the adjustment of the linear equalizer is terminated and the training proceeds to the adjustment of the decision-feedback equalizer (DFE). After the decision-feedback equalizer (DFE) has been adjusted for a predetermined period of time or the decision-feedback equalizer (DFE) has reached a stable state, also the adjustment of the linear equalizer (FFE) continued, whereby in this step both equalizers are being adjusted simultaneously. After both equalizers have been adjusted for a predetermined period of time or a stable state of the system has been reached, the detector of the sparse symbol constellation is replaced by a detector corresponding to the symbol constellation used during normal data transmission. Inasmuch the points of the sparse symbol constellation coincide with the respective points of the symbol constellation used in the data transmission state, the switch-over between the detectors is straightforward. Subsequently, receiver (RX) operates as if the symbol constellation of the data transmission state is adopted in the system, while transmitter (TX) kind of "incidentally" continues to send data corresponding only to certain points of the symbol constellation. Hereupon, the switch-over of transmitter (TX) into the full symbol constellation of the data transmission state causes no transient effects in the receiver (RX).

If the system happens to include a Tomlinson-Harashima precoder (TML), the tap gain coefficients of the decision-feedback equalizer (DFE) are transmitted after the training period (or at the end thereof) via an auxiliary channel of the upstream transmission direction to the transmitter. The transmission of tap gain coefficient can be accomplished using either the sparse symbol constellation or the normal symbol constellation of the data transmission state.

REFERENCES

[Lee & Messerschmitt] E. A. Lee and D. G. Messerschmitt, *Digital Communication*, Kluwer Academic Publishers, 1994.

What is claimed is:

1. A method for implementing a training phase of adaptive channel equalization in a digital communication arrangement comprising a transmitter, a receiver, and a channel, the method comprising:
   in the transmitter, coding a bit stream into symbols;
   in the transmitter, forming a transmission signal containing information of the symbols by using one of a QAM-modulation method and a CAP-modulation method;
   in the transmitter, sending the transmission signal to the channel;
   in the receiver, receiving the transmission signal from the channel;
   in the receiver, processing the received transmission signal with a linear equalizer and with an adaptive decision feedback equalizer; and
   forming at least one stop band on a spectrum of the transmission signal by using at least one band-stop filter, each band-stop filter being located in one of the transmitter and the receiver,
   the method further comprising:
   in the transmitter, using a sparse symbol constellation during at least a part of a training period of the adaptive decision feedback equalizer, a number of symbol states of the sparse symbol constellation being smaller than that of a basic symbol constellation used in a normal data transmission state;
   in the receiver, performing training of the adaptive decision feedback equalizer at least partially using symbol decisions made with a detector of the sparse symbol constellation; and
   moving the digital communication arrangement from the training phase to the normal data transmission state by replacing in the transmitter, the sparse symbol constellation with the basic symbol constellation used in the normal data transmission state and by replacing in the receiver, the detector of the sparse symbol constellation with a detector of the basic symbol constellation.

2. The method according to claim 1, wherein the points of the sparse symbol constellation coincide with predetermined points of the basic symbol constellation.

3. The method according to claim 1, wherein values of predetermined taps of the linear equalizer are adjusted with the help of an LMS algorithm, whereupon all the taps are adjusted with the help of the LMS algorithm.

4. The method according to claim 1, wherein the training of the linear equalizer is performed using the basic symbol constellation of the normal data transmission state, while the training of the decision-feedback equalizer is performed using the sparse symbol constellation.

5. The method according to claim 1, wherein the training of the equalizers comprises in a temporal order the steps of:
   1) setting the transmitter to send training data using the sparse symbol constellation,
   2) adjusting values of predetermined taps in the linear equalizer with the help of an LMS algorithm using the sparse symbol constellation,
   3) adjusting values of all the taps of the linear equalizer with the help of an LMS algorithm using the sparse symbol constellation,
   4) adjusting the decision-feedback equalizer using the sparse symbol constellation,
   5) adjusting both the linear equalizer and the decision-feedback equalizer using the sparse symbol constellation,
   6) switching over to the detector of the basic symbol constellation corresponding to the normal data transmission state, and
   7) setting the transmitter to send data using the basic symbol constellation corresponding to the normal data transmission state.

6. A system for implementing a training phase of adaptive channel equalization in a digital communication arrangement comprising a transmitter, a receiver, and a channel, the system comprising:
   in the transmitter, coding means for encoding a bit stream into symbols;
   in the transmitter, modulation means for forming a transmission signal containing information of the symbols by using one of a QAM-modulation method and a CAP-modulation method;
   in the transmitter, sending means for sending the transmission signal to the channel;
   in the receiver, receiving means for receiving the transmission signal from the channel;
   in the receiver, a linear equalizer and an adaptive decision feedback equalizer configured to process the received transmission signal;
   in the receiver, a detector configured to make symbol decisions from the received transmission signal processed by the linear equalizer and the adaptive decision feedback equalizer;
   in the receiver, decoding means for recovering the bit stream from the symbol decisions; and at least one band-stop filter forming at least one stop band on a spectrum of the transmission signal, each band-stop filter being located in one of the transmitter and the receiver, the system further comprising:

in the transmitter, means for generating symbols representing a sparse symbol constellation during at least a part of a training period of the adaptive decision feedback equalizer, the number of symbol states of the sparse symbol constellation being smaller than that of a basic symbol constellation that is used in a normal data transmission state;

in the transmitter, means for replacing the sparse symbol constellation with the basic symbol constellation used in the normal data transmission state as a response to a situation in which the communication arrangement moves from the training phase to the normal data transmission state;

in the receiver, means for performing training of the adaptive decision feedback equalizer at least partially using symbol decisions made with a detector of the sparse symbol constellation; and in the receiver, means for replacing the detector of the sparse symbol constellation with a detector of the basic symbol constellation used in the normal data transmission state as a response to a situation in which the digital communication arrangement moves from the training phase to the normal data transmission state.

7. The system according to claim 6, wherein the system includes means suited for generating the sparse symbol constellation to be used during the training period such that the points of the sparse symbol constellation coincide with predetermined points of the basic symbol constellation.

8. The system according to claim 6, wherein the system includes means for first adjusting the gains of predetermined taps in the training of the linear equalizer with the help of an LMS algorithm and subsequently adjusting all the taps with the help of the LMS algorithm.

9. The system according to claim 6, wherein the system includes means for performing the training of the linear equalizer using the basic symbol constellation of the normal data transmission state and means for performing the training of the decision-feedback equalizer using the sparse symbol constellation.

10. The system according to claim 6, wherein the system includes means for performing the training of the equalizers in a temporal order comprising the training steps of:
 1) setting the transmitter to send training data using the sparse symbol constellation,
 2) adjusting the gains of predetermined taps in the linear equalizer with the help of an LMS algorithm using the sparse symbol constellation,
 3) adjusting all the taps of the linear equalizer with the help of an LMS algorithm using the sparse symbol constellation,
 4) adjusting the decision-feedback equalizer using the sparse symbol constellation,
 5) adjusting both the linear equalizer and the decision-feedback equalizer using the sparse symbol constellation,
 6) switching over to a detector corresponding to the normal data transmission state, and
 7) setting the transmitter to send data using the basic symbol constellation corresponding to the normal data transmission state.

11. A transmitter for implementing a training phase of adaptive channel equalization in a digital communication arrangement comprising the transmitter, a receiver, and a channel, the transmitter comprising:

coding means for encoding a bit stream into symbols;

modulation means for forming a transmission signal containing information of the symbols by using one of a QAM-modulation method and a CAP-modulation method;

sending means for sending the transmission signal to the channel; and at least one band-stop filter forming at least one stop band on a spectrum of the transmission signal, the transmitter further comprising:

means for generating symbols representing a sparse symbol constellation during at least a part of a training period of an adaptive decision feedback equalizer of the receiver, the number of symbol states of the sparse symbol constellation being smaller than that of a basic symbol constellation used in a normal data transmission state; and means for replacing the sparse symbol constellation with the basic symbol constellation used in the normal data transmission state as a response to a situation in which the communication arrangement moves from the training phase to the normal data transmission state.

12. The transmitter according to claim 11, comprising a Tomlinson-Harashima precoder.

13. A receiver for implementing a training phase of adaptive channel equalization in a digital communication arrangement including a transmitter, the receiver, and a channel, the transmitter comprising:

receiving means for receiving a transmission signal of the transmitter from the channel;

a linear equalizer and an adaptive decision feedback equalizer configured to process the received transmission signal, the received transmission signal including symbols representing a sparse symbol constellation during at least a part of a training period of the adaptive decision feedback equalizer, the number of symbol states of the sparse symbol constellation being smaller than that of a basic symbol constellation that is used in a normal data transmission state;

a detector configured to make symbol decisions from the received transmission signal processed by the linear equalizer and the adaptive decision feedback equalizer;

decoding means for recovering the bit stream from the symbol decisions;

at least one band-stop filter forming at least one stop band on a spectrum of the transmission signal;

means for performing training of the adaptive decision feedback equalizer at least partially using symbol decisions made with detection of the sparse symbol constellation; and means for replacing the detector of the sparse symbol constellation with a detector of the basic symbol constellation used in the normal data transmission state as a response to a situation in which the digital communication arrangement moves from the training phase to the normal data transmission state.

14. The receiver according to claim 13, further comprising:

means for first adjusting gains of predetermined taps in the training of the linear equalizer with the help of an LMS algorithm and subsequently adjusting all the taps with the help of the LMS algorithm.

15. The receiver according to claim 13, further comprising:

means for performing the training of the linear equalizer using the basic symbol constellation of the normal data transmission state and means for performing the training of the decision-feedback equalizer using the sparse symbol constellation.

16. The receiver according to claim 13, further comprising means for performing the training of the equalizers in a temporal order comprising the training steps of:
1) receiving training data that uses the sparse symbol constellation,
2) adjusting gains of predetermined taps in the linear equalizer with the help of an LMS algorithm using the sparse symbol constellation,
3) adjusting all the taps of the linear equalizer with the help of an LMS algorithm using the sparse symbol constellation,
4) adjusting the decision-feedback equalizer using the sparse symbol constellation,
5) adjusting both the linear equalizer and the decision-feedback equalizer using the sparse symbol constellation,
6) switching over to a detector corresponding to the normal data transmission state, and
7) receiving data having the basic symbol constellation corresponding to the normal data transmission state.

* * * * *